US008873959B2

(12) United States Patent
Cvijetic et al.

(10) Patent No.: US 8,873,959 B2
(45) Date of Patent: Oct. 28, 2014

(54) 802.3AV COMPLIANT METHOD USING SMALL TIMESCALE BANDWIDTH ASSIGNMENT FOR INCREASED ONU DOWNSTREAM ENERGY EFFICIENCY

(71) Applicant: NEC Laboratories America, Inc., Princeton, NJ (US)

(72) Inventors: Neda Cvijetic, Plainsboro, NJ (US); Konstantinos Kanonakis, Athens (GR); Jingjing Zhang, East Brunswick, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 106 days.

(21) Appl. No.: 13/644,238

(22) Filed: Oct. 3, 2012

(65) Prior Publication Data

US 2013/0170826 A1    Jul. 4, 2013

Related U.S. Application Data

(60) Provisional application No. 61/543,374, filed on Oct. 5, 2011.

(51) Int. Cl.
*H04J 14/00*    (2006.01)
*H04B 10/27*    (2013.01)
*H04B 10/272*    (2013.01)
*H04Q 11/00*    (2006.01)

(52) U.S. Cl.
CPC .............. *H04B 10/27* (2013.01); *H04B 10/272* (2013.01); *H04Q 11/0067* (2013.01); *H04Q 2011/0064* (2013.01)
USPC ................................. 398/70; 398/66; 398/67

(58) Field of Classification Search
USPC .................................................. 398/9, 66–73
See application file for complete search history.

(56) References Cited

U.S. PATENT DOCUMENTS

| 8,000,602 B2* | 8/2011 | Haran et al. ..................... 398/72 |
| 8,275,261 B2* | 9/2012 | Mandin et al. .................. 398/72 |
| 8,498,534 B2* | 7/2013 | Hirth et al. ...................... 398/25 |
| 8,521,033 B2* | 8/2013 | Suvakovic .................... 398/171 |
| 8,600,231 B2* | 12/2013 | Skubic et al. .................... 398/38 |
| 2012/0008937 A1* | 1/2012 | Cheng et al. ...................... 398/1 |
| 2012/0141119 A1* | 6/2012 | Konno et al. .................. 398/25 |
| 2012/0148246 A1* | 6/2012 | Mukai et al. .................... 398/58 |
| 2012/0263469 A1* | 10/2012 | Zhang et al. .................... 398/66 |
| 2013/0077972 A1* | 3/2013 | Zhang et al. .................... 398/58 |
| 2013/0294775 A1* | 11/2013 | Hirth et al. ...................... 398/67 |

OTHER PUBLICATIONS

Lee et al, Design and Analysis of a Novel Energy Efficient Ethernet Passive Optical Network, Apr. 2010, Networks ICN, pp. 6-9.*
Yan et al, Energy Management Mechanism for Ethernet Passive Optical Networks (EPONs), May 2010, Communications ICC, pp. 1-5.*
Wong et al, Sleep Mode for Energy Saving PONs Advantages and Drawbacks, Nov. 2009, Globecom Workshops, pp. 1-6.*
Shi et al, An SLA-based energy-efficient scheduling scheme for EPON with sleep-mode ONU, Mar. 2011, OFC/NFOEC, pp. 1-3.*

* cited by examiner

*Primary Examiner* — Ken Vanderpuye
*Assistant Examiner* — Dibson Sanchez
(74) *Attorney, Agent, or Firm* — Joseph Kolodka

(57) ABSTRACT

A method for small scale time increased bandwidth assignment to increase optical network unit ONU downstream energy efficiency includes splitting of downstream scheduling cycles into multiple rounds, using selective ones of the multiple rounds as probing rounds and other than said selective ones of the multiple rounds as fixed rounds, the probing rounds and fixed rounds being cooperatively selected for energy efficiency without limitations in length of the downstream scheduling cycles.

7 Claims, 5 Drawing Sheets

802.3AV COMPLIANT METHOD USING SMALL TIMESCALE BANDWIDTH ASSIGNMENT FOR INCREASED ONU DOWNSTREAM ENERGY EFFICIENCY

RELATED APPLICATION INFORMATION

This application claims priority to provisional application No. 61/543,374 filed Oct. 5, 2011, the contents thereof are incorporated herein by reference

BACKGROUND OF THE INVENTION

The present invention relates generally to optical communications, and more particularly, to 802.3av compliant method using small timescale bandwidth assignment for increased optical network unit ONU downstream energy efficiency.

Energy efficient networking has become a key requirement in recent years. The main factors contributing to this need are the reduction of the global carbon footprint but also the reduction of network operational expenditures (OPEX). Moreover, regulators worldwide are beginning to mandate compliance with specific energy consumption figures. For these reasons, novel technological solutions are being sought to minimize energy consumption at various layers, ranging from the physical layer up to the higher ones. Although Passive Optical Networks (PON) are inherently more energy-efficient than other types of access networks due to their use of a passive network infrastructure as shown in FIG. 1, which features a power splitter (300), it is still desirable to cut down energy consumption as much as possible. In fact, the major energy consumption contributors in a PON are the Optical Network Units (ONUs), e.g. ONU i (400) in FIG. 1, located at the customer side. Although a single ONU consumes roughly the same power as an Optical Line Terminal (OLT) (100) port, the sharing of the latter by a multitude of ONUs (typically 16 to 64) implies that major savings per user can be obtained by seeking efficiency at the ONU side. Furthermore, significant reductions in the energy consumed by ONUs are beneficial in case of emergency situations, whereby ONUs would be required to operate in battery mode. The most prominent way of achieving this is to exploit information from the Medium Access Control (MAC) layer to by selectively setting ONU components to "sleep" mode whenever they are not required to operate. For example, the ONU transmitter (Tx) (401) or receiver (Rx) (402) in FIG. 1 can be set to sleep mode whenever the ONU is not scheduled to transmit in the upstream direction or receive in the downstream. At the same time, with the IEEE standard 802.3av for 10G-EPON published recently, an important requirement is to achieve the aforementioned energy-efficient operation without altering the protocol itself, since vendors have already invested in standard-compliant equipment development. Moreover, it is crucial that quality of service (QoS) is compromised as little as possible due to the energy-efficient operation. In fact, the upstream direction case is straightforward since the OLT informs the ONU via GATE Multi Point Control Protocol (MPCP) frames about the upstream timeslots during which it can transmit. Accordingly, the ONU can set its Tx (401) to sleep mode during the rest of the time. For the downstream direction, a similar approach cannot be followed since in general the ONU has to inspect all frames broadcast by the OLT and keep the ones with its own destination address.

A fixed bandwidth allocation (FBA) scheme has been proposed by others to achieve ONU downstream energy efficiency. FIG. 2 shows en example of FBA operation. Downstream transmission is split in scheduling cycles of fixed duration. During each cycle the OLT transmits data to each ONU for a fixed number of timeslots. Let $\Delta_k(i)$ denote the time between the end of downstream transmission to ONU i in cycle k−1 and the beginning of the one in cycle k and $E_k(i)$ the duration of this transmission. In FBA, both $\Delta_k(i)$ and $E_k(i)$ are fixed for all i and k. From the energy efficiency perspective FBA is very effective. Since downstream bandwidth allocation is performed in regular intervals, known in advance to the ONUs, the latter can easily turn their Rx to sleep mode exactly when this is needed. This is indicated in FIG. 2 by the ONU Rx alternating between the awake ('A') and asleep ('S') mode. The white-colored intervals indicated the requirement for the ONU to switch between states. The latter must be taken into account by the ONU when calculating its next wake-up instant.

The main downside of the previously proposed FBA scheme (FIG. 2) is that it cannot adapt to bursty traffic and does not provide statistical multiplexing among ONUs. In other words, depending on the loading conditions it can either lead to excessive bandwidth waste or delay.

An alternative scheme proposed by others does not use a fixed downstream cycle duration. The exact duration is determined dynamically by the data in the downstream ONU queues and the scheme used for downstream grant sizing. This scheme aims at improving downstream energy efficiency by ensuring that the OLT will never use a downstream scheduling cycle shorter than a given value each time. This value for cycle k is determined for ONU i as $\rho \cdot \Delta_{k-1}(i)$, where $\rho$ is a system parameter, known to the OLT and all ONUs. Each ONU therefore has to constantly monitor $\Delta_k(i)$ and accordingly set its Rx to sleep mode for a duration equal to $\rho \cdot \Delta_k(i)$ in the next cycle. The OLT on the other hand has to take care not to schedule the next transmission for the ONU sooner than $\rho \cdot \Delta_k(i)$ (it can though be scheduled later than that depending on the traffic of other ONUs). In the next cycle, a new interval $\Delta_{k+1}(i)$ will be decided based on the data in the rest of the ONUs' queues. In addition, it is crucial that the OLT transmits downstream GATE messages to an ONU only after the transmission of data; otherwise it would be impossible for the ONU to go to sleep without missing some grants.

An example of the alternative scheme of is shown in FIG. 3. This scheme maintains a certain degree of dynamicity, since both $\Delta_k(i)$ and $E_k(i)$ are decided during every cycle. However, its performance is compromised due to the requirement for a minimum cycle time each time. Therefore there is a heavy trade-off between system utilization/delay performance and energy-efficiency. It is probable, depending on the actual traffic patterns, to have either early or late wake ups. In the former case (cycle k+1 in FIG. 3), $\rho \cdot \Delta_k(1) < \Delta_{k+1}(1)$, resulting in an underestimation of the upcoming cycle and reducing the energy efficiency benefits. In the latter (cycle k+2 in FIG. 3) the upcoming cycle would need to be shorter (given the actual traffic) but the OLT is detained by the $\rho \cdot \Delta_{k+1}(1)$ function. Therefore, although the selection of the $\rho$ parameter is extremely crucial, the scheme's performance is affected by both the overall network load as well as the exact traffic patterns, rendering the control of QoS versus energy-efficiency trade-off very difficult.

Accordingly, there is a need for solving the problem of ONU-side energy efficient downstream operation with a method that provides a better energy-efficiency/QoS trade-off.

BRIEF SUMMARY OF THE INVENTION

The present invention is directed a method for small scale time increased bandwidth assignment to increase optical network unit ONU downstream energy efficiency. The method includes splitting of downstream scheduling cycles into multiple rounds, using selective ones of the multiple rounds as probing rounds and other than said selective ones of the multiple rounds as fixed rounds, the probing rounds and fixed rounds being cooperatively selected for energy efficiency without limitations in length of the downstream scheduling cycles.

These and other advantages of the invention will be apparent to those of ordinary skill in the art by reference to the following detailed description and the accompanying drawings.

DETAILED DESCRIPTION

The present invention is directed an inventive method for downstream scheduling which allows the ONUs to be able to determine the downstream timeslots during which they can set their Rx to the sleep mode, while performing dynamic downstream bandwidth allocation. The method is adjustable to provide the required trade-off between energy-efficiency and QoS performance.

From the foregoing it can be appreciated that the inventive method enables significant energy efficiency benefits without modifying the existing 10G-EPON protocol. In addition, the average energy savings achieved by the inventive method are independent of the average network load and the traffic patterns. Thus, it allows for easier control over the parameters to achieve the required QoS performance versus energy savings trade-off.

This invention introduces a Small Timescale Fixed Bandwidth Allocation (STFBA) procedure to achieve downstream energy efficiency combined with scheduling dynamicity. The main idea behind STFBA is that it operates similarly to FBA, but only during limited durations. In that way, it can both leverage on the energy savings potential of FBA but also manage to efficiently handle traffic fluctuations in a dynamic manner. In addition, the energy savings versus QoS performance trade-off can be controlled much more easily than the above alternative method discussed above.

Figure 1:
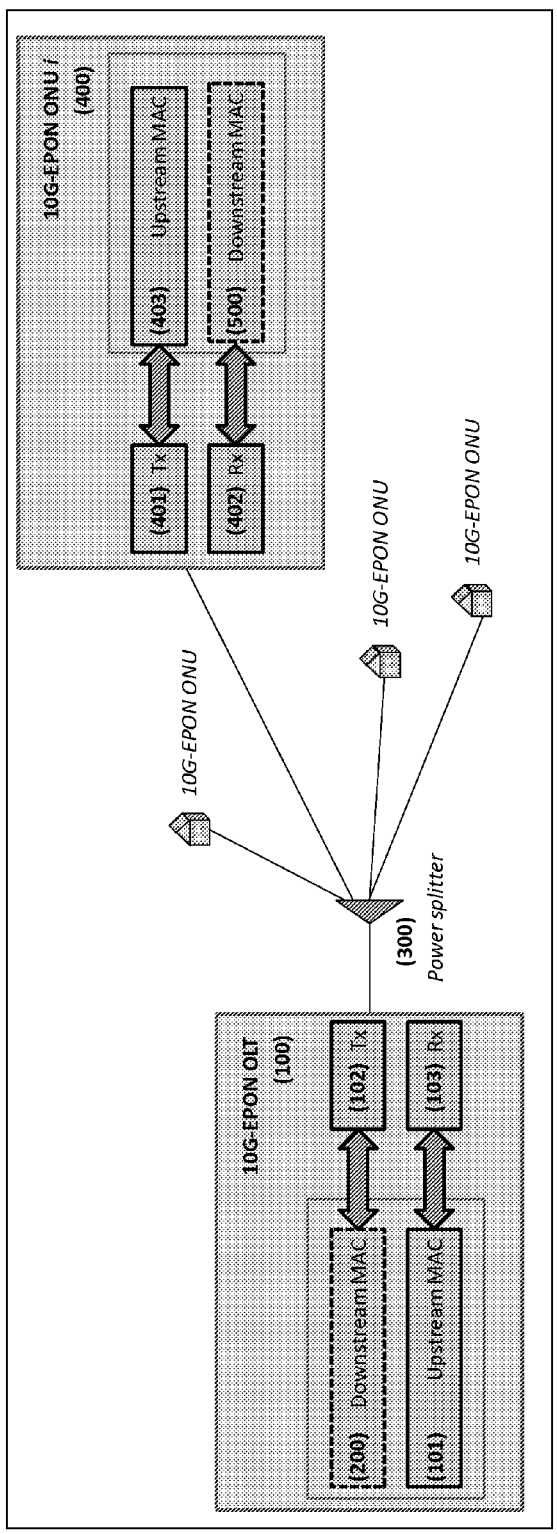
FIG. 1 shows an exemplary generic 10G-EPON configuration.
Figure 2:
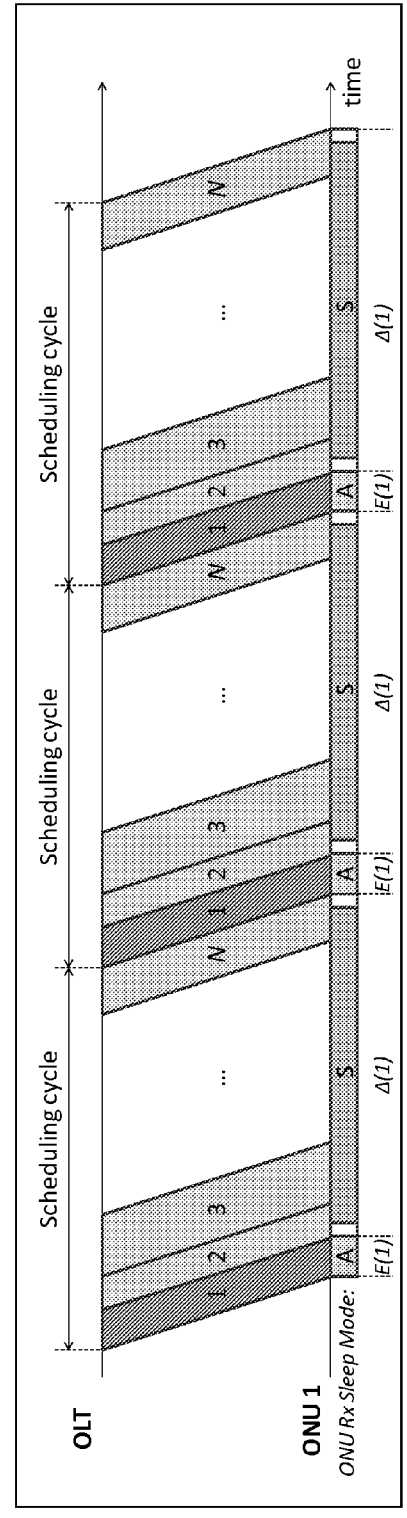
FIG. 2 is an example of downstream fixed bandwidth allocation (FBA) according to the prior art.
Figure 3:
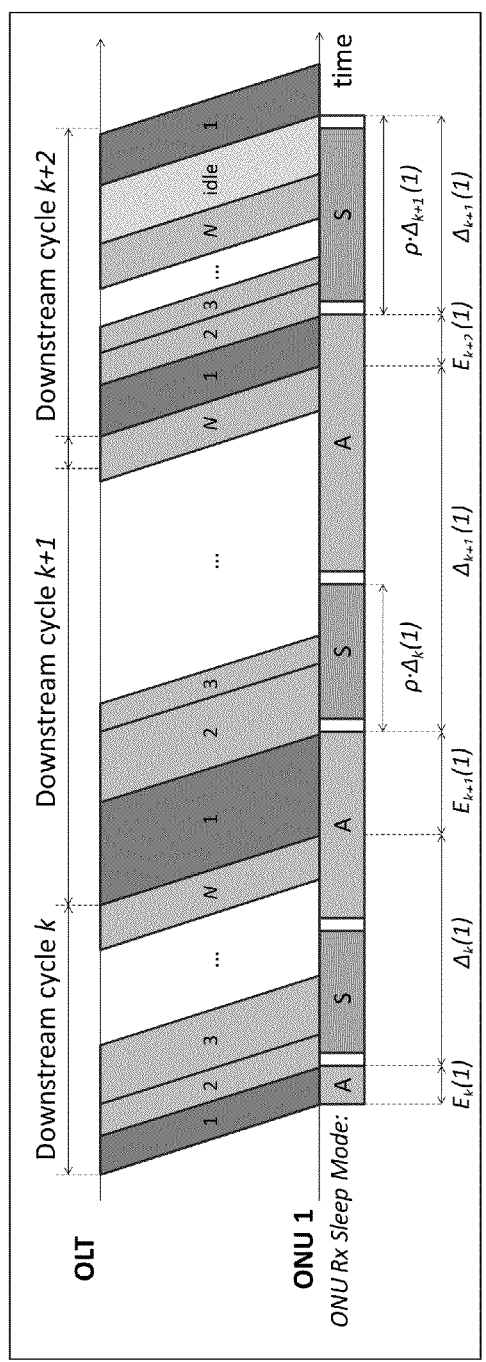
FIG. 3 is an example of another bandwidth allocation according to the prior art.
Figure 4:
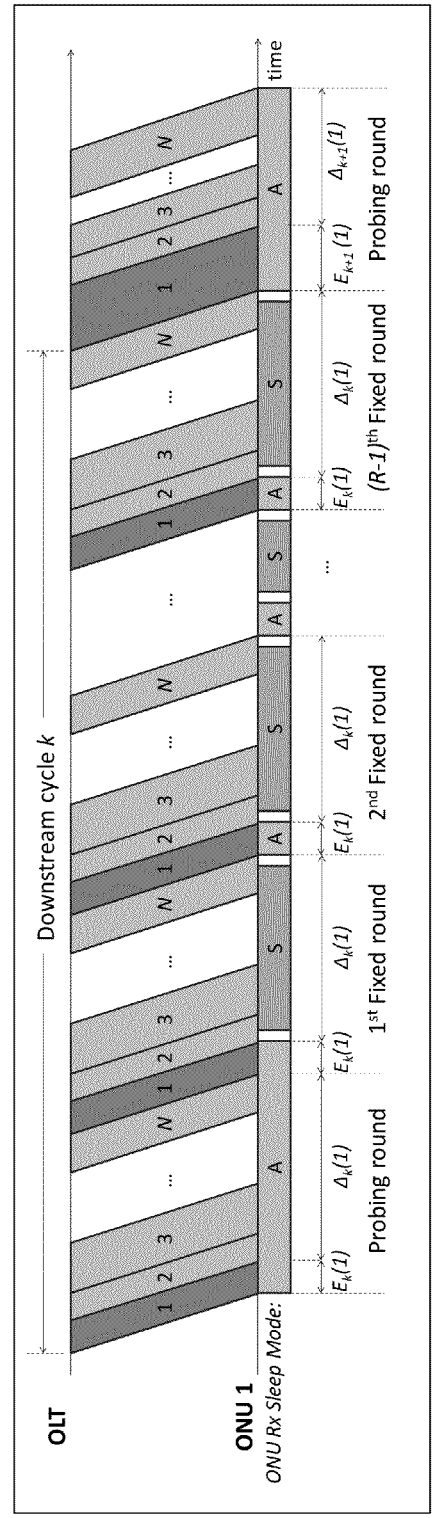
FIG. 4 is exemplary small timescale fixed bandwidth allocation (STFBA) method in accordance with the invention.

The operation of the proposed STFBA is as follows: although the OLT maintains the concept of downstream cycles intact, the way grant sizing is performed is modified. As shown in FIG. 4, each downstream scheduling cycle is split into R rounds: one probing round followed by R−1 fixed ones, with the OLT sending R transmissions per scheduling cycle.

Figure 5:
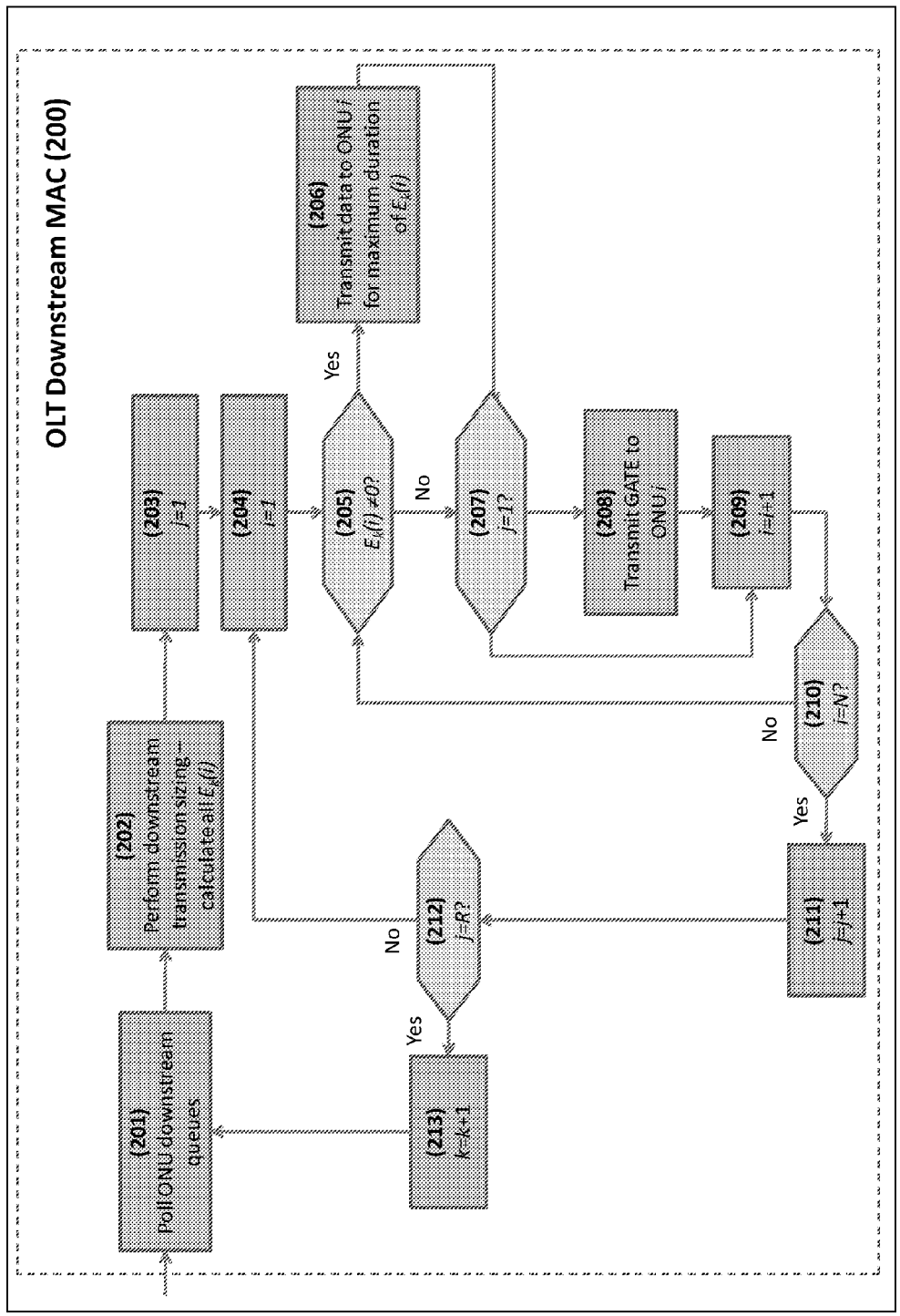
FIG. 5 is a block diagram of optical line terminal OLT downstream MAC operation under the inventive STFBA.

FIG. 5 explains operation flow of the proposed OLT downstream MAC (200). As shown in FIG. 5, after the end of the $R^{th}$ transmission, the OLT polls all ONU downstream queues (201) and decides again on the upcoming cycle downstream timeslot durations for each of them (202). The exact grant sizing for the whole cycle can be decided based on any of the schemes proposed in the literature [Kramer, G.; Mukherjee, B.; Pesavento, G.; "IPACT a dynamic protocol for an Ethernet PON (EPON), "Communications Magazine IEEE, vol. 40, no.2, pp. 74-80, February 2002]. However, the difference is that under STFBA the grant calculated for the whole cycle k is split into R equal parts, denoted as $E_k(i)$, to be sent (206) in an equal number of rounds and in regular time intervals $\Delta_k(i)$. Note that a GATE message (and the request for a REPORT) only needs to be sent to each ONU once every downstream scheduling cycle (during the probing round) (208). Blocks 203-207 and 210-213 are counters, iteration or threshold checks in the process.

Figure 6:
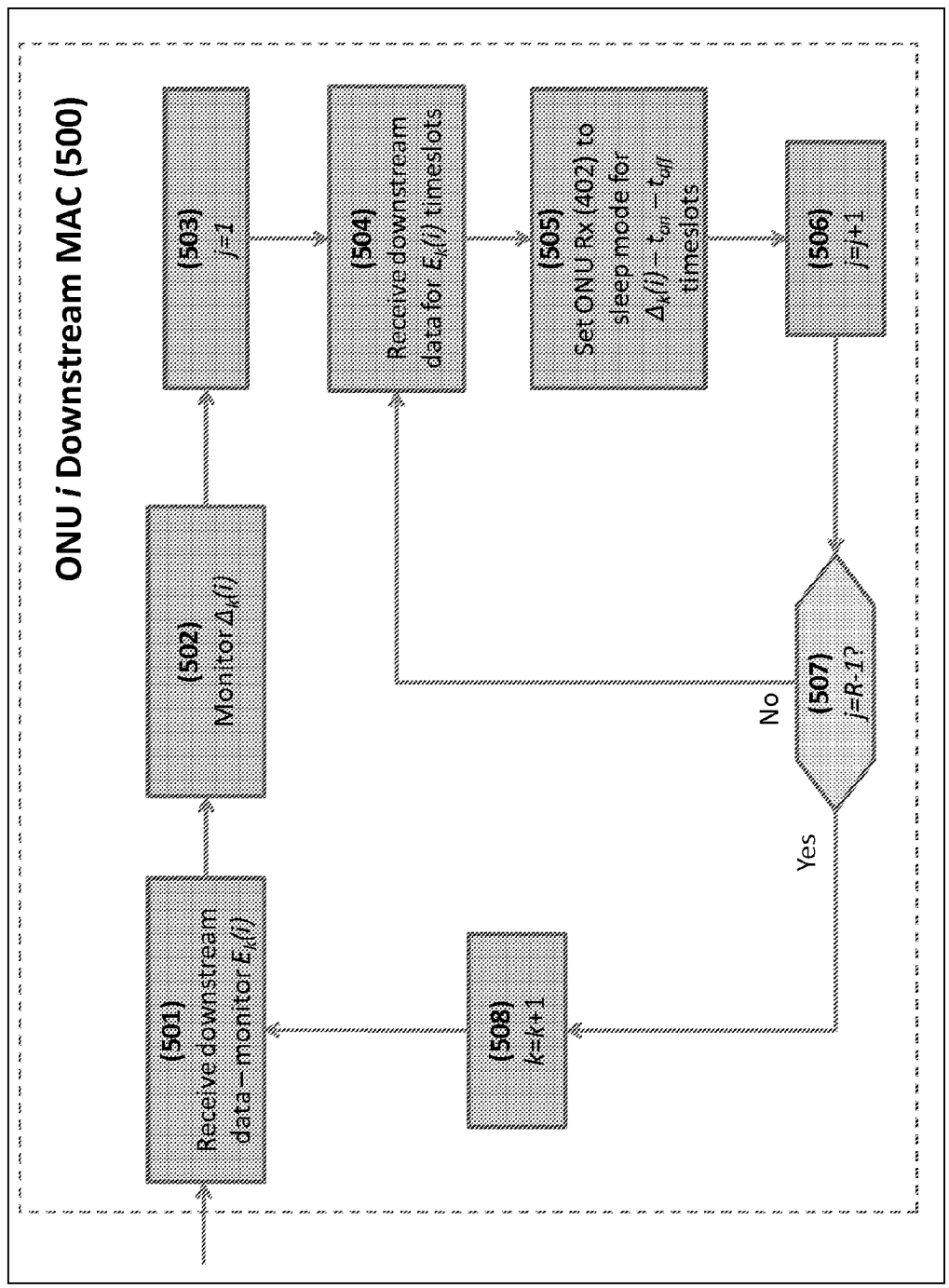
FIG. 6 is block diagram of the ONU downstream operation under the inventive SFTBA method.

The inventive downstream MAC (500) aspect of an ONU (400) under the STFBA scheme is described as a block flow diagram in FIG. 6. As shown in FIG. 6, the ONU has to monitor during the probing round of cycle k both the transmission duration destined to it $E_k(i)$ (501), and the interval $\Delta_k(i)$ (502) between the two consecutive transmissions destined to it. Then, knowing that the OLT will perform fixed allocation during the upcoming R−1 rounds, it can use the calculated values to first receive data for the known duration of $E_k(i)$ (504) and then safely switch its Rx (402) to the sleep mode (505) for a duration equal to $\Delta_k(i)-t_{on}-t_{off}$, i.e. taking into account the transition times between the asleep and awake states. Note that in the next probing round, the OLT will most probably have decided a new allocation based on the updated queue polling and therefore new values $E_{k+1}(i)$ and $\Delta_{k+1}(i)$ will be calculated and applied by the ONU. Blocks 501, 503, and 506-508 are iteration counters or threshold checks in the process.

It is noted that while a very large number of rounds per cycle (hence very short durations) would result in energy savings approaching those of FBA, this would also lead to increased network underutilization due to the requirement for the OLT side to transmit integral Ethernet frames during each round.

Figure 7:
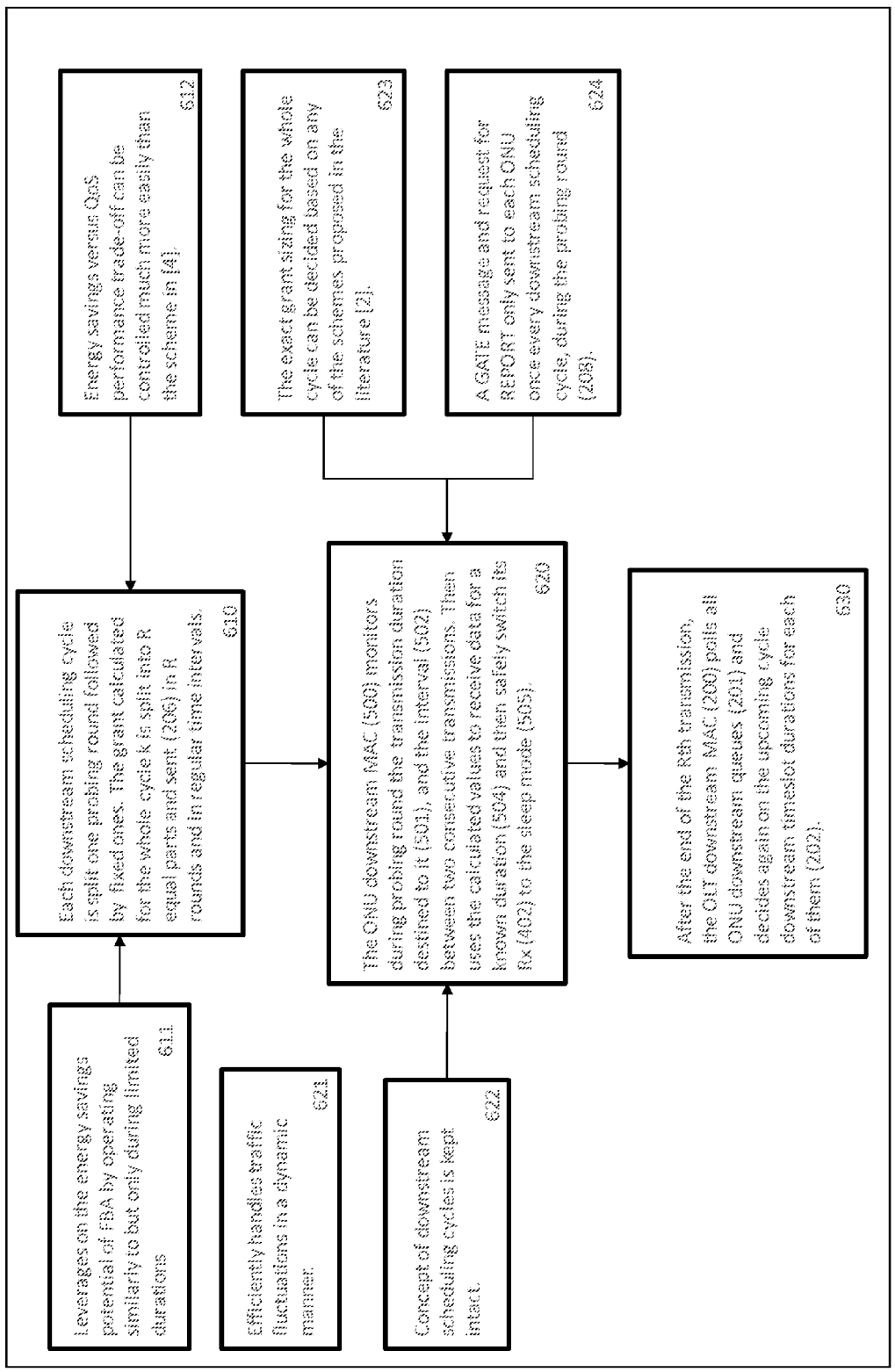
FIG. 7 is a block diagram of aspects of the invention.

FIG. 7 shows hierarchical operation sequence of the inventive STFBA. Each downstream scheduling cycle is split one probing round followed by fixed ones. The grant calculated for the whole cycle k is split into R equal parts and sent (206) in R rounds and in regular time intervals 610. This leverages on the energy savings potential of FBA by operating similarly to but only during limited durations 611. Energy savings versus QoS performance trade-off can be controlled much more easily than the alternative prior art scheme noted above.

The ONU downstream MAC (500) monitors during probing round the transmission duration destined to it (501), and the interval (502) between two consecutive transmissions. Then uses the calculated values to receive data for a known duration (504) and then safely switch its Rx (402) to the sleep mode (505) 620. Traffic fluctuations are handled efficiently in a dynamic manner 621 and the concept of downstream scheduling cycles is kept intact 622. The exact grant sizing for the whole cycle can be decided based on any of the schemes proposed in the prior art literature noted above 623. A GATE message and request for REPORT only sent to each ONU once every downstream scheduling cycle, during the probing round (208) 624.

After the end of the Rth transmission, the OLT downstream MAC (200) polls all ONU downstream queues (201) and decides again on the upcoming cycle downstream timeslot durations for each of them (202) 630.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method for small scale time increased bandwidth assignment to increase optical network unit ONU downstream energy efficiency, said method comprising the steps of:
   a. splitting of downstream scheduling cycles into multiple rounds at an optical line terminal (OLT), comprising:
      i) splitting each downstream scheduling cycle into one probing round followed by fixed rounds, splitting a grant calculated from a whole scheduling cycle k into R equal parts and sending the calculated grant in R rounds and regular intervals; and
   b. using selected ones of said multiple rounds as probing rounds and other than said selected ones of said multiple rounds as fixed rounds, said probing rounds and fixed rounds being cooperatively selected for energy efficiency without limitations in length of said downstream scheduling cycles, wherein said probing rounds represent a transmission, to ONUs in a network, of information comprising a respective transmission duration and interval between consecutive transmissions for each ONU.

2. The method of claim 1, wherein said step a) comprises:
   ii) monitoring by an ONU downstream medium access control MAC during said probing round a transmission duration destined to it and an interval between two consecutive transmissions.

3. The method of claim 2, wherein said step b) comprises:
   iii) using calculated grant values to receive data for a known duration and switching its receiver to a sleep mode.

4. The method of claim 3, wherein said step b) comprises:
   iv) an optical line terminal OLT downstream MAC, after end of an Rth transmission, polling all ONUs downstream queues and decides again on upcoming cycle downstream timeslot durations for each of them.

5. The method of claim 3, wherein said step iii) comprises calculating an exact grant sizing for a whole scheduling cycle based on a predetermined scheme.

6. The method of claim 3, wherein said step iii) comprises only sending a gate message and a request for report to each ONU once every downstream scheduling cycle, during said probing round.

7. The method of claim 1, wherein said step a) comprises controlling energy savings versus quality-of-service QoS performance tradeoff.

* * * * *